United States Patent Office 3,641,175
Patented Feb. 8, 1972

3,641,175
PROCESS FOR THE PRODUCTION OF DIMERS AND TRIMERS OF CONJUGATED DIENES
Gunther Wilke and Ernst Willi Muller, both of Kaiser-Wilhelm-Platz 1, Mulheim (Ruhr), Germany
No Drawing. Division of application Ser. No. 532,900, Mar. 9, 1966, which is a continuation-in-part of application Ser. No. 76,520, Dec. 19, 1960, and a continuation of application Ser. No. 555,203, June 3, 1966, which in turn is a continuation of application Ser. No. 203,753, June 20, 1962. This application Oct. 17, 1969, Ser. No. 867,394
Claims priority, application Germany, Dec. 22, 1959, St 15,930; Apr. 28, 1960, St 16,427; June 30, 1961, St 18,017
Int. Cl. C07c 3/10
U.S. Cl. 260—666 B    39 Claims

ABSTRACT OF THE DISCLOSURE

Production of dimers and trimers of 1,3-diolefins with a carbonyl moiety-free complex of a transition metal of Group VIII of the Periodic Table and an electron donor.

---

The application is a division of application 532,900, filed Mar. 9, 1966, which in turn is a continuation-in-part of application Ser. No. 76,520 filed Dec. 19, 1960, now abandoned and a continuation-in-part of streamlined continuation application Ser. No. 555,203, now abandoned which in turn is a streamlined continuation application of application Ser. No. 203,753 filed June 20, 1962, now abandoned.

It is known that conjugated diolefins, such as butadiene, isoprene, piperylene and the like can be dimerized and trimerized to cyclic dienes and trienes by the action of titanium or chromium halides and organic aluminum compounds upon the conjugated diolefin at temperatures of up to about 150° C. and in the presence of solvents such as aliphatic, aromatic or halogenated hydrocarbons; see U.S. Pat. No. 2,964,574 for illustrations of this subject matter.

According to German patent specification 881,511 and U.S. Pat. No. 2,686,209, dimerization of conjugated diolefins is catalyzed by nickel-carbonyl-organic phosphorous compound complex of the formula:

or

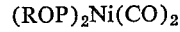

It will be appreciated that these catalyst are derived and prepared from nickel carbonyl, which is extremely toxic, and activated by pretreatment with acetylene under pressure. Reaction times of up to 100 hours have been noted to be required to produce useful conversions of the conjugated diene to its cyclic dimer or trimer when catalysts as immediately herein above defined have been used.

It is therefore an object of this invention to provide a novel process of dimerizing and trimerizing conjugated diolefins using novel catalysts comprising a carbonyl moiety-free complex of a transition metal of Group VIII of the Periodic Table II bonded to an electron donor Lewis base.

Other and additional objects of this invention will become apparent from a consideration of this entire specification including the claims appended hereto.

As used herein the term "carbonyl moiety" is intended to mean a C—O group itself as in the compound nickel carbonyl as distinguished from carbonyl containing compounds such as ketones, carboxylic acids and aldehydes.

The new catalysts for the new oligomerization process of this invention are complexes containing Group VIII metals II bonded to an electron donating group which complex contains no carbonyl moiety therein. The Group VIII metals according to this invention are iron, cobalt, nickel, ruthenium, rhodium, palladium, osmium, iridium and platinum. Preferred Group VIII metals are iron, cobalt and nickel, with nickel being the most preferred.

Suitable electron donors of the complex of this invention are organic compounds generally categorized as Lewis bases. Lewis bases are those compounds having free electron pairs which are capable of acting as electron donors. These donors may contain unsaturation either in the form of olefinic or acetylenic unsaturation; they may be organic diketones. Organic compounds of metals or metaloids of Group Va of the Periodic Table where such compound contains at least one pair of donatable unshared electrons are suitable electron donors. Such Group Va metal compounds are exemplified by alkyl and aryl phosphines, phosphites, stibines, tertiary amines and arsines. Organic diketones suitable for use as electron donors are exemplified by biacetyl and acetyl acetonate. Suitable unsaturated compounds include cyclic polyolefins such as cyclo-octatetraene, cyclo-octadiene and cyclo-dodecatriene; and acetylenes such as phenyl acetylene and butyne-2. The reaction by which the complexes of the instant invention are prepared comprises mixing a Group VIII transition metal compound with a suitable electron donor under reduction conditions such as in the presence of a suitable organo-metallic compound reducing agent. The reaction mixture is preferably produced as a solution or suspension as aforesaid. Heat of reaction is suitably removed by external cooling or, if the reaction medium has a sufficiently low boiling point, such heat of reaction may be removed by boiling off the reaction medium.

It is often desirable to carry out the complex formation in a reaction solvent medium. The applicable solvents are those which are substantially inert with respect to the reactant and the reaction product under the conditions of reaction and under the conditions of resolution of the reaction product. Such solvents include aromatic and saturated aliphatic and alicyclic hydrocarbons such as hexane, cyclohexane and benzene; open chain or cyclic ethers such as diethyl ether, tetrahydrofuran are also useful.

The reaction is carried out under relatively mild conditions. Temperatures of about −80 to 100° C. are suitable, with temperatures of about −40° C. to +5° C. being preferred.

The Group VIII transition metal compound reactant is suitably a salt of an organic moiety such as for example acetylacetonate, alcoholate, glyoxime, acetoacetate, etc.

The organometallic reducing agent suitably contains a metal of Groups I, II or III, preferably Ia, IIa or IIIa of the Periodic Table as for example lithium, zinc, magnesium or aluminum, most preferably aluminum. The organic portion of the organometallic reducing agent is suitably an alkyl, cycloalkyl, alkoxy, aryl, aralkyl group or mixtures thereof for example ethyl, butyl, phenyl, cyclohexyl, ethoxy. It is preferred to employ an alkoxyl alkyl aluminum such as ethoxydiethyl aluminum.

The Group VIII metal complexes of this invention may also be prepared by a complex exchange process which can be analogized to an ester interchange reaction. Thus for example, catalysts according to this invention can be prepared by reaction between a Group VIII transition metal salt and an electron donor in the presence of a reducing agent and the complex thus formed reacted with another electron donor, such as a triaryl phosphite, to exchange the second electron donor ligand for the first used electron donor ligand. Exemplary of this exchange reaction is the reaction of triphenyl phosphite with bis-cyclo-octadienyl nickel (O) to form triphenylphosphite nickel (O).

The dimerization and/or trimerization process according to the invention is suitably carried out by mixing a conjugated diene with catalyst solution, either as a pure or relatively pure compound or as an unresolved preparation reaction mixture, prepared as aforesaid under pressure. The reaction mixture is heated to sustain the reaction after which the reaction product is resolved. Suitably the reaction is carried out at about 1 to 20 atmospheres pressure and about 20 to 150° C. The reaction temperature is preferably about 60 to 100° C.

The conjugated diene reactant may be introduced into the reaction mass as a pure material but it is also within the scope of this invention to employ mixed reactant streams, that is those containing the reactant admixed with other materials which are not particularly affected under the reaction conditions. Thus, butadiene may be fed as a mixture thereof with butanes and/or butenes such as for example the product stream from a $C_4$ dehydrogenation reaction for the production of butadiene.

Depending on the choice of the transition metal, the electron donor and the molar ratio between transition metal and organometallic component and electron donor, catalysts are formed, as further explained in the examples below, which permit the formation from butadiene of either cyclooctadi-1,5-ene as well as relatively small quantities of vinyl cyclohexene or trans, trans,trans-cyclododecatri-1,5,9-ene as well as traces of trans,trans, cis-cyclododecatri-1,5,9-ene as principal product, or mixtures of the said compounds. The cyclic dimers or trimers are formed in particularly high yields when using nickel compounds. On the other hand, if iron compounds are used, the 5-methyl-heptatri-1,3,6-ene is obtained as principal product. It is particularly advantageous to use for the production of the catalysts those compounds of transition metals which have good solubility in the solvents being employed, but catalysts can also be obtained from compounds which are sparingly soluble in the solvents, only in these cases the formation of the catalysts from its components takes a considerably longer time. For this reason, transition metal compounds which have proved especially suitable according to the process of the invention are those in which the transition metal atoms are linked to organic radicals, such as acetyl acetonates, acetoacetic ester enolates, alcoholates, salts of weak organic acids or dimethyl glyoxime compounds.

The compounds obtained according to the process of the invention are valuable starting products for further synthesis reactions; for example, cyclooctadi-1,5-ene may be used for obtaining suberic acid or the corresponding 9-membered lactam, cyclododecatri-1,5,9-ene may be used for obtaining dodecanic diacid or the 13-membered lactam. Both the dicarboxylic acids and the lactams are valuable monomers for the producton of polyesters or polyamides. Styrene is obtained from vinyl cyclohexene by dehydrogenation.

It has now surprisingly been found to be possible to make cyclooctadi-1,5-ene the main product, apart from relatively small quantities of 4-vinyl cyclohexene, by using the new catalysts having a specific composition. On the other hand, it is also possible to make cyclododecatri-1,5,9-ene the main product, but this is formed quite unexpectedly as practically pure trans, trans,trans-cyclododecatri-1,5,9-ene when using the new catalysts.

It has additionally been found to be possible to produce a hitherto unknown dimer of butadiene, the constitution of which has been recognised as that of 5-methyl-heptatri-1,3,6-ene, this substance having a boiling point at 115° C./745 mm. Hg and a refractive index at $n_D^{20}$ of 1.4632.

An improvement in the above described general process for the trimerization and dimerization of conjugated dienes is available when the electron donor Lewis base is a triaryl phosphite.

It has been found very surprisingly that when using triaryl phosphite as electron donors the mole ratio of these donors to the nickel compounds as the compound of the transition metal cannot be varied at will but must be not higher than 4:1 and preferably from 2:1 to 1:1 to obtain high conversions of butadiene with high yields of cyclooctadi-1,5-ene in short reaction periods. If the mole ratio is increased to more than 4:1, the conversion is reduced very considerably as may be seen from Example 66.

It is also possible when using the specific electron donors of the invention to operate in the presence of solvents which are not reactive with the catalysts. However, advantageous operation without the use of a special solvent is possible by adding initially an appropriate amount of the main product produced by the reaction, e.g. cyclooctadi-1,5-ene, as a diluent. It is avoided in this manner that larger amounts of a solvent must be separated when processing the reaction product.

The process of the invention may be carried out under both atmospheric pressure and superatmospheric pressure, e.g. under pressures of 1 to 200 atmospheres. However, it is preferred to operate in a pressure range of from 1 to 50 atmospheres. The reaction temperatures preferably range between 0° and 200° C., best results being obtained in a temperature range between 70° and 140° C. The process may be carried out discontinuously, but continuous operation is also possible and advantageous.

Particularly favorable results are obtained in the process of the invention if, for the preparation of the catalyst, the 1,3-diolefin, e.g. butadiene, is either present already during the reaction of the transition metal compound with the organometallic compound, the metal hydride or complex metal hydride or is added immediately after this reaction.

The compounds obtained by the process of the invention are valuable starting products for further synthesis reactions; for example, cyclooctadi-1,5-ene may be used for obtaining suberic acid or the corresponding 5-membered lactam.

In order that the invention may be further understood, the following examples are given by way of illustration only:

EXAMPLE 1

1 g. of nickel acetylacetonate together with 8 g. of triphenyl phosphine (molar ratio Ni:P=1:8) are dissolved in 60 cc. of absolute benzene with heating. The mixture is cooled with iced water and 35.5 cc. of a benzene solution of ethoxydiethyl aluminum (422 mg./cc.) are slowly added. A reddish-brown solution is formed, which is introduced with exclusion of air into a 2-litre stainless steel autoclave equipped with a magnetic stirrer mechanism. 125 g. of liquid butadiene are forced into the mixture under pressure. The autoclave is heated to 80° C. and the contents are stirred until the pressure has fallen to about 2 atm., and another 125 g. of butadiene are then introduced under pressure. The reaction is completed after a total period of 5 hours, the reaction of the butadiene being quantitative. The autoclave contents are then discharged and freed by steam distillation from the catalyst and non-volatile fractions. The distillate is separated by careful fractionation into the components. The precise composition of the distillate obtained by steam distillation is determined by gas chromatographic analysis. The non-volatile constituents are dissolved in benzene, separated from the catalyst residue and weighed after distilling off the benzene. The following products were obtained: 76 g. of 4-vinyl cyclohexene=30.4% of the reacted butadiene, 156 g. of cyclooctadi-1,5-ene= 62.5% of the reacted butadiene, 9 g. of cyclododecatri-1,5,9-ene=3.6% of the reacted butadiene and 9 g. of non-volatile fractions=3.6% of the reacted butadiene. The total yield of both dimers and the cyclododecatri-1,5,9-ene is 96.4% of the reacted butadiene.

EXAMPLES 2-7

The following experiments were carried out according to Example 1, but the molar ratios of Ni; Al; P and the temperature are varied as indicated in Table 1. In each case, the catalyst is prepared from 1 g. of nickel acetylacetonate and 250 g. of butadiene are introduced.

TABLE I

| No. | Ethoxy diethyl aluminium | Triphenyl phosphine | Temp./conversion | Percent of reacted butadiene | | | |
|---|---|---|---|---|---|---|---|
| | | | | Vinyl cyclohexene | Cyclooctadi-1,5-ene | Cyclododecatri-1,5,9-ene | Non-volatile fractions |
| 2 | 30 | 8 | 80°/98.2 | 30.5 | 62.5 | 3.3 | 3.7 |
| 3 | 30 | 4 | 80°/96.3 | 23.1 | 67.1 | 7.7 | 2.1 |
| 4 | 30 | 2 | 80°/94.2 | 17 | 65 | 16.2 | 1.8 |
| 5 | 30 | 0.5 | 80°/92.2 | 9 | 47.3 | 41.0 | 2.6 |
| 6 | 6 | 20 | 60°/98.7 | 34.1 | 61.3 | 1.4 | 3.2 |
| 7 | 6 | 2 | 90°/80.9 | 21.1 | 53.5 | 24.6 | 0.7 |

EXAMPLES 8-15

The following examples are carried out in accordance with Example 1 except that different organometallic components or metal hydrides and different types of solvents are employed. 1 g. of nickel acetylacetonate and 8 g. of triphenyl phosphine are used in each case for the preparation of the catalyst, and 250 g. of butadiene is employed in each case.

TABLE II

| No. | Reducing agent, mol/mol Ni | Conversion, percent | Percent of reacted butadiene | | | |
|---|---|---|---|---|---|---|
| | | | Vinyl cyclohexene | Cyclooctadi-1,5-ene | Cyclododecatri-1,5,9-ene | Non-volatile fractions |
| 8 | 30 Al (C$_2$H$_5$)$_3$ | 99 | 41.3 | 15.8 | 9.0 | 32.8 |
| 9 | 30 Al(C$_2$H$_5$)$_2$H | 91 | 40.2 | 30.1 | 7.5 | 22 |
| 10 | 30 (Ga(C$_4$H$_9$)$_3$ | 100 | 19.4 | 64.6 | 12.0 | 4 |
| 11 | 30 C$_2$H$_5$MgBr | 100 | 21.9 | 34.2 | 2.1 | 29.6 |
| 12 | 5 LiAlH$_4$ | 99.6 | 22.4 | 69.7 | 2.7 | 5.2 |
| 13 | 5 LiAlH$_4$ | 91 | 29.2 | 64.6 | 4.5 | 1.7 |
| 14 | 30 C$_6$H$_5$MgBr | 86 | 20 | 49.2 | 1.6 | 26 |
| 15 | 30 Zn(C$_2$H$_5$)$_2$ | 92.2 | 28.1 | 48.3 | 1.2 | 15.2 |

The solvent used for Examples 8-10 and 16 is benzene, that for Examples 11, 12 and 14 ether and for example 13 is tetrahydrofuran.

EXAMPLES 16-21

The following examples are carried out according to Example 1, except that the triphenyl phosphine is replaced by varying quantities of phenyl acetylene as electron donor. The catalysts are prepared in each case from 1 g. of nickel acetylacetone and from varying quantities of ethoxy diethyl aluminium. 250 g. of butadiene are used in each case.

TABLE III

| No. | Ethoxy diethylaluminium | Phenylacetylene | Conversion | Percent of reacted butadiene | | | |
|---|---|---|---|---|---|---|---|
| | | | | Vinyl cyclohexene | Cyclo octadi-1,5-ene | Cyclododecatri-1,5,9-ene | Non-volatile fractions |
| 16 | 1.5 | 16 | 7.6 | 17.8 | 1.1 | 11.6 | 68.7 |
| 17 | 6 | 16 | 89 | 3.2 | 3.0 | 77.6 | 10.2 |
| 18 | 9 | 8 | 30.8 | 5.2 | 2.7 | 88.8 | 3.3 |
| 19 | 30 | 4 | 99 | 8.2 | 23.9 | 62.2 | 4.0 |
| 20 | 120 | 40 | 24.3 | 8.7 | 1.8 | 61.8 | 22.7 |
| 21 | 30 | | 58.5 | 10.5 | 24.9 | 57.8 | 6.8 |

EXAMPLE 22

The catalyst is prepared as in Example 1, but a reaction mixture of 51.9% of butadiene and 48.1% of 1-butene is employed. 440 g. of this gas mixture are reacted in two parts over 4 hours at 80° C. The unreacted gas is blown off and condensed. 208 g. of practically pure 1-butene, that is to say, 98.5% of the 1-butene introduced is obtained. The reaction product is worked up according to Example 1. It has the following composition 3.9% of vinyl cyclohexene, 89.5% of clyclooctadi-1,5-ene, 2.6% of cyclododecatri-1,5,9-ene and 2% of non-volatile fractions. Together it amounts to 220 g. (corresponding to 97% of the reacted butadiene).

EXAMPLE 23

The reaction is carried out in accordance with Example 1 or Example 61, but using cobalt acetylacetonate as transition metal component. 5.9% of the butadiene used are reacted at 80° C. over 16 hours. The reaction product has the following composition: 30.6% of vinyl cyclohexene, 18.6% of cyclooctadi-1,5-ene, 6.7% of 5-methyl heptatri-1,3,6-ene, 1.7% of cyclododecatri-1,5,9-ene and 42.4% of non-volatile fractions.

EXAMPLE 24

1 g. of nickel acetylacetonate is dissolved together with 2.05 g. of triphenyl phosphine in 60 cc. of absolute benzene and 40 cc. of a solution of ethoxy diethyl aluminium (280 mg./cc.) are added thereto. The reddish-brown catalyst solution is reacted according to Example 1 with butadiene, a total of 0.9 kg. of butadiene being reacted over 36 hours at 80° C. The reaction product consists of: 114 g.=12.6% of vinyl cyclohexene, 520 g.=57.8% of cyclooctadi-1,5-ene, 255 g.=28.3% of cyclododecatri-1,5,9-ene and 10 g.=1.1% of non-volatile fractions.

EXAMPLE 25

The catalyst is prepared as in Example 1, but there is used in the reaction a mixture (such as directly formed by the dehydrogenation of butane) consisting of 56.6% of n-butane, 27.3% of butene, 13% of butadiene and 3% of ethylene and ethane. 1.1 kg. of the mixture are reacted over 2 hours at 100° C. The unreacted gas is discharged while hot and condensed. 950 g. of a mixture of 66.2% of n-butane, 30.2% of butene, 2.5% of ethylene and ethane and 0.2% of benzene are obtained. The reaction product is worked up according to Example 1. 143 g. are obtained, corresponding to a 100% conversion, consisting of 16.7% of vinyl cyclohexene, 68.3% of cyclooctadiene, 9.4% of nC$_{12}$ hydrocarbon, 4.3% of cyclododecatriene and 1.3% of non-volatile fractions.

EXAMPLES 26, 27, 28

The following examples are carried out according to Example 1, but the nickel acetylacetonate is replaced by nickel dimethyl glyoxime (26), nickel formate (27) and nickel dicyclopentadienyl (28). The catalysts are prepared from 1 g. of nickel compound and the quantity of reducing agent indicated and each is reacted with 250 g. of butadiene at 80° C. over 10 hours.

A represents ethoxydiethyl aluminium and Li represents lithium aluminium hydride.

TABLE IV

| No. | Reducing agent, mol/mol Ni | Triphenylphosphine | Conversion, percent | Percent of reacted butadiene | | | |
|---|---|---|---|---|---|---|---|
| | | | | Vinyl cyclohexene | Cyclooctadi-1,5-ene | Cyclododecatri-1,5,9-ene [1] | Non-volatile fractions |
| 26 | 30:1 (A) | 2 | 49.7 | 11.0 | 58.3 | 26.2 | 4.5 |
| 27 | 6:1 (A) | 2 | 79.5 | 12.5 | 69.9 | 14.4 | 3.2 |
| 28 | 4:1 (Li) | 2 | 30.2 | 17.9 | 60.0 | 16.5 | 5.6 |

[1] n-C$_{12}$ hydrocarbon plus.

EXAMPLES 29-40

Examples 29 to 40 are carried out in accordance with Example 1, but using different donors. The donor used for Example 29 is methoxy vinyl acetylene and that for Example 30 phosphorus acid trimorpholide. In Example 31 cyclododecene is used as electron donor. The electron donors for Examples 32-40 are as follows:

Example 32 $N(C_2H_5)_3$, Example 33 $P(C_2H_5)_3$, Example 34 $As(C_2H_5)_3$, Example 35, $Sb(C_2H_5)_3$, Example 36 $Bi(C_2H_5)_3$, Example 37, $N(C_6H_5)_3$, Example 38, $As(C_6H_5)_3$, Example 39, $Sb(C_6H_5)_3$ and Example 40 $Bi(C_6H_5)_3$. Each of the catalysts is prepared from 1 g. of nickel acetylacetonate, the quantity indicated of ethoxy diethyl aluminium and 4 mols of the donor indicated in benzene as solvent. 250 g. of butadiene is reacted at 80° C. in each case.

TABLE V

| No. | Reducing agent, mol/mol Ni | Reaction time, hrs. | Conversion | Percent of the reacted butadiene ||| Nonvolatile fractions |
|---|---|---|---|---|---|---|---|
| | | | | Vinyl cyclohexene | Cyclooctadiene | Cyclododecatriene [1] | |
| 29 | 6:1 | 16 | 80.5 | 8.3 | 7.2 | 76.7 | 7.8 |
| 30 | 6:1 | 17 | 64.3 | 10.2 | 78.4 | 6.2 | 5.2 |
| 31 | 4:1 | 2 | 92.3 | 4.6 | 3.5 | 78.0 | 13.9 |
| 32 | 6:1 | 18 | 13.3 | 17.2 | 1.0 | 1.0 | 80.8 |
| 33 | 6:1 | 16 | 13.8 | 20.0 | 55.0 | 7.0 | 18.0 |
| 34 | 6:1 | 22 | 30.4 | 16.8 | 17.1 | 55.7 | 10.4 |
| 35 | 6:1 | 20 | 58.2 | 7.3 | 15.4 | 73.3 | 4.0 |
| 36 | 6:1 | 16 | 83.3 | 5.3 | 12.2 | 80.0 | 2.5 |
| 37 | 6:1 | 16 | 28.7 | 9.2 | 0.2 | 86.3 | 3.1 |
| 38 | 6:1 | 11 | 100 | 5.3 | 10.6 | 80.5 | 3.6 |
| 39 | 6:1 | 16 | 92.7 | 4.5 | 13.9 | 89.8 | 2.8 |
| 40 | 6:1 | 22 | 7.9 | 26.1 | 3.8 | 45.1 | 25.0 |

[1] n-$C_{12}$ hydrocarbon plus.

EXAMPLES 41 to 47

The following Examples are carried out according to Example 1, but the reaction temperature is varied. Each of the catalysts is prepared from 1 g. of nickel acetylacetonate, 10 mols of ethoxy diethyl aluminium per mol of nickel and 4 mols of triphenyl phosphine per mol of nickel and each is reacted with 200 g. of butadiene.

TABLE VI

| No. | Temp. | Time, hours | Conversion | Vinyl cyclohexene | Cyclooctadiene | Cyclododecatriene [1] | Nonvolatile fractions |
|---|---|---|---|---|---|---|---|
| 41 | 70 | 22 | 99.7 | 25.0 | 67.1 | 6.9 | 1.0 |
| 42 | 100 | 1 | 73.0 | 21.0 | 69.3 | 8.4 | 1.3 |
| 43 | 100 | ¾ | 93.3 | 18.8 | 70.4 | 9.3 | 1.5 |
| 44 | 125 | 1 | 84.0 | 26.6 | 63.6 | 8.3 | 1.5 |
| 45 | 130 | ¾ | 92.6 | 20.3 | 63.6 | 6.2 | 9.9 |
| 46 | 160 | ¾ | 81.3 | 20.8 | 63.2 | 6.3 | 9.7 |
| 47 | 180 | ¾ | 63.9 | 31.4 | 40.9 | 3.2 | 24.4 |

[1] n-$C_{12}$ hydrocarbon plus.

EXAMPLES 48 to 51

The following examples are carried out according to Example 1, but the reaction temperature is varied. The catalyst is prepared as in Examples 41 to 47, but the triphenyl phosphine is replaced by phosphorus acid trimorpholide.

TABLE VII

| No. | Temp., °C. | Time, hours | Conversion, percent | Vinyl cyclohexene | Cyclooctadiene | Cyclododecatriene [1] | Nonvolatile fractions |
|---|---|---|---|---|---|---|---|
| 48 | 60 | 12 | 71.6 | 35.6 | 59.6 | 3.7 | 1.7 |
| 49 | 95 | 4 | 73.8 | 17.6 | 72.8 | 7.3 | 2.3 |
| 50 | 128 | ¼ | 69.8 | 25.6 | 68.7 | 3.9 | 1.8 |
| 51 | 150 | ⅓ | 67.0 | 23.6 | 59.2 | 9.7 | 7.5 |

[1] n-$C_{12}$ hydrocarbon plus.

EXAMPLES 52 TO 54

The following examples are carried out according to Example 1, but the reaction temperature is varied. The catalysts are prepared as in Examples 41 to 47 but phenyl acetylene is used instead of triphenyl phosphine.

TABLE VIII

| No. | Temp., °C. | Time, hours | Conversion | Vinyl cyclohexene | Cyclooctadiene | Cyclododecatriene | n-$C_{12}$ hydrocarbon | Nonvolatile fractions |
|---|---|---|---|---|---|---|---|---|
| 52 | 110 | 4 | 93.0 | 6.4 | 15.9 | 68.0 | 7.8 | 1.9 |
| 53 | 140 | 1 | 87.5 | 9.0 | 11.7 | 60.7 | 10.4 | 8.2 |
| 54 | 175 | ⅔ | 93.0 | 12.0 | 10.0 | 36.2 | 8.8 | 33.0 |

EXAMPLE 55

5.75 g. of the complex having the formula $$Ni(P(C_6H_5)_3)_4$$

are dissolved in 50 cc. of absolute benzene and 300 g. of butadiene are reacted therewith at 106° C. over 1½ hours. The reaction product is worked up according to Example 1. 291 g. (97% of the theoretical) are obtained containing 18.8% of vinyl cyclohexene, 59.3% of cyclooctadiene, 10.0% of cyclododecatriene, 3.9% of n-$C_{12}$-hydrocarbon and 8% of non-volatile fractions.

EXAMPLE 56

The operation is carried out as in Example 55, but using 4 g. of bis-triphenyl phosphine-nickel cyclooctadiene-(O), $((C_6H_5)_3P)_2NiC_8H_{12}$, dissolved in 50 cc. of absolute benzene as catalyst. 200 g. of butadiene are reacted over 1 hour at 100° C. 200 g. (100% of the theoretical) of reaction product are obtained consisting of 26.1% of vinyl cyclohexene, 62.2% of cyclooctadiene, 7.5% of cyclododecatriene and 4.1% of n-$C_{12}$-hydrocarbon.

EXAMPLE 57

The procedure of Example 55 is used, but employing 4 g. of bis triphenyl phosphine nickel-(O), $$((C_6H_5)_3P)_2Ni$$

dissolved in 50 cc. of absolute benzene as catalyst. 200 g. of butadiene are reacted over 2 hours at 100° C. and 182 g. (91% of the theoretical) of reaction product are obtained consisting of 29% of vinyl cyclohexene, 62.4% of cyclooctadiene, 7.2% of cyclododecatriene and 1.4% of n-$C_{12}$-hydrocarbon.

EXAMPLE 58

This example is effected as Example 55, but using 7 g. of bis-cyclooctadiene-nickel-(O), dissolved in 100 cc. of absolute benzene as catalyst. 200 g. of butadiene are reacted within 12 hours at 100° C. and 94 g.=47.2% of the theoretical of a reaction product are obtained, which contains 8.5% of vinyl cyclohexene, 17.4% of cyclooctadiene, 66.3% of cyclododecatriene, 4.1% of open-chain $C_8$-hydrocarbons and 3.7% of open-chain $C_{12}$-hydrocarbons.

EXAMPLE 59

3 g. of nickel acetylacetonate and 25 g. of triphenyl phosphine are dissolved in 250 cc. of benzene. This solution has added thereto, while cooling, a solution of ethoxydiethyl aluminium in benzene, which contains 350 mmol of the aluminium compound. 100 g. of piperylene are heated in an autoclave for 36 hours to 120° C. using this catalyst solution. With a conversion of 70%, there are obtained 40–45 g. of a mixture of 2-dimethyl-cyclooctadienes of boiling point$_{90}$ 108–109° C. and $n_D^{20}$=1.4811, which consists of about 60% of 3,7-dimethylcyclooctadi-1,5-ene and about 40% of 3,4-dimethylcyclooctadi-1,5-ene.

EXAMPLE 60

The catalyst is prepared as in Example 59 and heated together with 300 g. of isoprene in an autoclave for 12 hours to 80° C. There are obtained 15 g. of paradiprene, 20 g. of dipentene and 80–90 g. of a mixture of 2-dimethylcyclooctadienes of the boiling point$_{90}$ 124–125° C. and $n_D^{20}$=1.4890, which is composed of about 70% of 2,6-dimethyl-cyclooctadi-1,5-ene and about 30% of 2,5-dimethyl cyclooctadi-1,5-ene. The conversion amounts to 70–80%.

EXAMPLE 61

1 g. of iron acetylacetonate is dissolved together with 8 g. of triphenyl phosphine in 60 cc. of benzene and reacted with 35.5 g. of the ethoxydiethyl aluminum solution specified in Example 1. A reddish-orange solution is formed. A total of 250 g. of butadiene is heated with the catalyst solution for 16 hours to 80° C. The reaction product is worked up as described in Example 1. It amounts to 61 g. (24.3% of the butadiene introduced) and has the following composition: 30% of vinyl cyclohexene, 1.5% of cyclooctadi-1,5-ene, 42% of 5-methyl heptatri-1,3,6-ene and 19.7% of non-volatile fractions. The 5-methyl-heptatri-1,3,6-ene boils at 115–115.5° C./745 mm. Hg and has a refractive index $n_D^{20}$=1.4632.

With catalytic hydrogenation, the quantity of hydrogen equivalent for 3 double bonds is taken up. The hydrogenation product is identical with 5-methyl heptane. 5-methyl-heptatriene adds 1 mol of maleic acid anhydride. By saponification the corresponding dicarboxylic acid with the melting point 173–175° C. is obtained.

EXAMPLE 62

0.753 gms.=2.43 millimoles of triphenyl phosphite are dissolved in 15 ml. of benzene and the solution is saturated with butadiene. The solution is then mixed with 0.334 gms.=1.2 millimoles of bis-cyclooctadi-1,5-ene-nickel-(O), which results in a red catalyst solution. Saturation of the solution with butadiene is repeated after one day and after two days. After five days, 3.57 grams of the butadiene are reacted. The reaction product contains 0.32 grams=8.9% of vinyl cyclohexene, 3.18 grams =89.2% of cyclooctadi-1,5-ene and 0.07 grams=1.9% of all trans-cyclododecatri-1,5,9-ene in addition to traces of higher polymers.

EXAMPLE 63

0.625 grams=2.02 millimoles of triphenyl phosphite are dissolved in 15 ml. of benzene. The solution is mixed with 0.278 grams=1.01 millimoles of bis-cyclooctadi-1,5-ene-nickel-(O). After several minutes, precipitation of a minor amount of metallic nickel is observed. After 24 hours, the solution is saturated with butadiene and then treated as described in Example 1. After 7 days, there are obtained 4.19 grams of a reaction product which contains 0.46 grams=11% of vinyl cyclohexene, 3.70 grams=88% of cyclooctadi-1,5-ene and 0.03 grams=0.8% of all trans-cyclododecatriene in addition to traces of higher polymers.

EXAMPLE 64

0.497 grams=1.81 millimoles of bis-cyclooctadi-1,5-ene-nickel-(O) are dissolved together with 1.13 grams =3.62 millimoles of triphenyl phosphite in 20 ml. of benzene and the solution is immediately drawn by suction into an evacuated 200 ml. autoclave of stainless steel. 45 grams of butadiene are introduced under pressure and the autoclave is heated to 80° C. After 2 hours of reaction, 39 grams of a reaction product (87% conversion) containing 4.2 grams=10.8% of vinyl cyclohexene, 33.6 grams=86.1% of cyclooctadi-1,5-ene and 0.7 grams =1.8% of all-trans-cyclododecatriene in addition to 0.5 grams=1.2% of higher polymers are obtained.

EXAMPLE 65

20.8 grams=45.2 millimoles of tri-α-naphthyl phosphite are dissolved together with 5.8 grams=22.6 millimoles of nickel acetylacetonate in a mixture of 85 grams cyclooctadi-1,5-ene and 15 grams of butadiene. The mixture is cooled with water and mixed with 5.9 grams=42.2 millimoles of ethoxy diethyl aluminum. The catalyst solution of orange color is introduced by suction into an evacuated 2 liter autoclave of stainless steel equipped with a magnetic stirrer. Butadiene in amount of 200 grams is introduced under pressure and the autoclave is heated to 85° C. The temperature in the interior rises to 115° C. due to the reaction heat. The supply of external heat is stopped and after about 15 minutes the pressure has dropped to 3 atmospheres. Additional butadiene is now introduced under pressure at a rate sufficient to maintain the temperature in the interior between 110° and 115° C. In doing so, the pressure does not rise beyond 4 atmospheres. 1185 grams of butadiene are injected within 1.5 hours. After a total of 1.75 hours of reaction time, 1249 grams of a reaction product (80% conversion) containing 102 grams =8.2% of vinyl cyclohexene, 1128 grams=90.2% of cyclooctadi-1,5-ene and 5.7 grams=0.5% all transcyclododecatriene in addition to 13.4 grams=1.1% of higher polymers are obtained.

EXAMPLE 66

The reaction is carried out continuously in the following manner: The reactor used is a copper capillary of 100 meters in length and 4 mm. in inside diameter which is wound upon itself and placed in an oil bath heated to 120° C. Both a benzenic catalyst solution and liquid butadiene are injected into the heated capillary by means of two injection pumps. Arranged at the end of the reactor is a relief valve set at 30 atmospheres and releasing the product which is obtained at a rate corresponding to the output of the two pumps to atmospheric pressure. The ratio of catalyst rate to butadiene rate is preferably such that the butadiene is reacted to the greatest extent possible with a residence time of one hour.

The following test data illustrate the process:

Reaction of nickel acetylacetonate with ethoxy diethyl aluminum in the presence of triphenyl phosphite and small amounts of butadiene results in the formation of a catalyst solution in benezene, which contains 1 grams of nickel in 200 ml. of solution. A Ni:P:Al mole ratio of 1:2:2 is selected.

Within 50 minutes, 330 ml. of catalyst solution and 500 grams of butadiene are injected into the reactor. Following this, 1 liter of additional benzene is pumped into the reactor thereby discharging the entire reaction product. There are obtained 490 grams of a reaction product (98% conversion) which contains 1.1 grams=0.2% of 5-methyl heptatri-1,3,6-ene, 58.4 grams=11.9% of vinyl cyclohexene, 399 grams=81.4% of cyclooctadi-1.5-ene, 16.5 grams=3.4% of all transcyclododecatriene and 4.4 grams=0.9% of trans, trans, cis-cyclododecatriene in addition to 10.7 grams=2.2% of higher polymers. 400 grams of butadiene/gram of nickel/hour are reacted with a 98% conversion.

When a 1:4 ratio of nickel to triphenyl phosphite is used and 250 ml. of catalyst solution and 440 grams of butadiene are injected within 40 minutes with otherwise unchanged conditions, then 117.3 grams of a reaction product (27% conversion) containing 22.8 grams= 19.4% of vinyl cyclohexene, 85.7 grams=73% of cyclooctadi-1,5-ene, 1.4 grams=1.2% of all trans-cyclododecatriene in addition to 7.4 grams=6.3% of higher polymers are obtained. Only 150 grams of butadiene/gram of nickel/hour are reacted with an only 27% conversion.

If, under otherwise identical conditions, a 1:6 ratio of nickel tro triphenyl phosphite is used and 350 ml. of catalyst solution and 500 grams of butadiene are injected within 50 minutes, then 19.8 grams of a reaction product (4% conversion) containing 5.5 grams=27.8% of vinyl cyclohexene, 13.75 grams=69.5% of cyclooctadi-1,5-ene and 0.55 grams=2.8% of higher polymers are obtained. Only 15 grams of butadiene/gram of nickel/hour are reacted with an only 4% conversion.

EXAMPLE 67

The procedure is the same as in Example 66 except that the temperature is 150° C. and a 1:2 mole ratio of nickel to triphenyl phosphite is used. Within 30 minutes, 220 ml. of catalyst solution and 305 grams of butadiene are injected. There are obtained 304 grams of a reaction product (100% conversion) which contains 38.8 grams= 12.8% of vinyl cyclohexene, 239.3 grams=78.7% of cyclooctadi-1,5-ene, 11.6 grams=3.8% of all trans-cyclododecatriene, 1.3 grams=0.4% of trans,- trans, cis-cyclododecatriene, 12.9 grams=4.2% of higher polymers. With a substantially quantitative conversion, 600 grams of butadiene are reacted per gram of nickel per hour.

EXAMPLE 68

The procedure is the same as in Example 66 except that triguaiacyl phosphite is used as the donor, the mole ratio of nickel to donor being 1:2. The temperature used is 100° C. Within 1.5 hours, 590 ml. of catalyst solution and 900 grams of butadiene are injected. There are obtained 740 grams of a reaction product (82% conversion) which contains 53.9 grams=7.3% of vinyl cyclohexene, 672.0 grams=91% of cyclooctadi-1,5-ene, 6.2 grams= 0.8 of all trans-cyclododecatriene and 7.7 grams=1.0% of higher polymers. 200 grams of butadiene/gram of nickel/hour are reacted with a 82% conversion.

EXAMPLE 69

The procedure is the same as in Example 66 except that tri-(o-oxy-diphenyl)-phosphite is used as the donor, the ratio of donor to Ni being 1:1. The temperature used is 80° C. Within 25 minutes, 340 ml. of catalyst solution and 560 grams of butadiene are injected. There are obtained 403 grams of a reaction product (72% conversion) which contains 15.4 grams=3.8% of vinyl cyclohexene, 384 grams=95.4% of cyclooctadiene and 3.2 grams=0.8% of higher polymers. At a 72% conversion, butadiene is reacted at a rate of 500 grams/gram of nickel/hour.

EXAMPLE 70

The procedure is the same as in Example 69 except that the temperature used is 120° C. Within 27 minutes, 330 ml. of catalyst solution and 800 grams of butadiene are injected. There are obtained 647 grams of a product (81% conversion) which contains 32.7 grams=5.1% of vinyl cyclohexene, 598 grams=92.5% of cyclooctadiene and 16.4 grams=2.5% of cyclododecatriene. With an 81% conversion, butadiene is reacted at a rate of 870 grams/gram of nickel/hour.

EXAMPLES 71 TO 74

The procedure is the same as in Example 66 except that the temperature used is 120° C. and the mole ratio of nickel to donor is varied. The donor used is triguaiacyl phosphite.

In the following tables VCH means vinyl cyclohexene, COD means cyclooctadi-1,5-ene, and CDT means cyclododecatri-1,5,9-ene.

| Example | Ni:donor | Conversion | Percent VCH | Percent COD | Percent CDT | Percent Cyclic hydrocarbons | Percent Polymers | Grams butadiene/ g. Ni/ hour |
|---|---|---|---|---|---|---|---|---|
| 71 | 1:0.5 | 48 | 7.9 | 82.7 | 8.7 | 99.3 | 0.7 | 410 |
| 72 | 1:1 | 90 | 7.0 | 85.3 | 6.1 | 98.4 | 1.6 | 930 |
| 73 | 1:2 | 98 | 6.8 | 89.2 | 2.4 | 98.4 | 1.6 | 670 |
| 74 | 1:4 | 93 | 10.2 | 88.3 | 1.4 | 99.9 | | 230 |

EXAMPLES 75 TO 77

The procedure is the same as that described in Example 73 except that the nickel salt is reduced with different organic aluminium compounds.

| Example | Ni:Al | Reducing agent | Conversion | Percent VCH | Percent COD | Percent CDT | Percent Polymers | Grams butadiene/ g. Ni/ hour |
|---|---|---|---|---|---|---|---|---|
| 75 | 1:1 | Al(i-C$_4$H$_9$)$_3$ | 80 | 6.5 | 89.5 | 2.3 | 1.3 | 650 |
| 76 | 1:1 | Al(C$_2$H$_5$)$_3$ | 82 | 8.1 | 88.4 | 2.5 | 1.0 | 660 |
| 77 | 1:1 | HAl(C$_2$H$_5$)$_2$ | 21 | 9.8 | 76.2 | Trace | 14.0 | 110 |

EXAMPLES 78 TO 80

The procedure in case of Examples 78 to 79 is the same as in Example 73 except that the temperature used is 80° C. and the relief valve of the reactor is set at different pressures. The procedure in Example 80 is the same as in Example 81.

| Example | Pressure atm. | Conversion | Percent VCH | Percent COD | Percent CDT | Percent Polymers | Grams butadiene/g. Ni/hour |
|---|---|---|---|---|---|---|---|
| 78 | 150 | 51 | 6.8 | 91.7 | 1.5 | | 300 |
| 79 | 35 | 90 | 7.1 | 92.3 | Trace | 0.7 | 290 |
| 80 | 1 | 99 | 7.1 | 92.3 | | 0.7 | 300 |

EXAMPLES 81 TO 83

The reaction is carried out at atmospheric pressure in the following manner: A catalyst solution in cyclooctadiene, containing 1 gram of nickel per 100 ml. of solution, is prepared by reduction of nickel acetylacetonate with ethoxy diethyl aluminium in the presence of triaryl phosphite and small amounts of butadiene. A 1:1:2 mole ratio of Ni:donor:Al is used. The three possible trimonomethoxy-phenyl phosphites are used as the donors. The catalyst solution contained in a flask equipped with a thermometer, stirrer and an inlet pipe is heated at 80° C. while introducing butadiene and vigorously stirred at this temperature.

| Example | Position of OCH$_3$ group | Percent VCH | Percent COD | Percent CDT | Percent Polymers | Grams butadiene/g. Ni/hour |
|---|---|---|---|---|---|---|
| 81 | Ortho | 6.0 | 91.3 | 1.6 | 1.1 | 300 |
| 82 | Meta | 7.5 | 83.3 | 9.3 | | 140 |
| 83 | Para | 10.1 | 78.6 | 9.6 | 1.8 | 90 |

All of the three experiments were carried out for 3 hours.

EXAMPLE 84

The procedure is the same as in Example 81 except that tri(ortho oxydiphenyl)phosphite is used as the donor. The butadiene charged is dried by means of organometallic compounds. 7.42 kgs. of butadiene are reacted with 1.12 grams Ni within 9 hours. 5.53 kgs. of product are distilled off at 14 mm. Hg. Additional butadiene was introduced at 80° C. into the remaining solution. Additional 4.97 kgs. of butadiene were reacted during the course of 7 hours. The following rates of conversion were determined by means of a calibrated rotameter:

Beginning of 1st batch:
 810 grams butadiene/gram Ni/hour
After 9 hours:
 655 grams butadiene/gram Ni/hour=81% of initial activity.

What is claimed:

1. Process for the production of dimers and trimers of conjugated dienes which comprises contacting a conjugated diene with a catalyst comprising a carbonyl moiety-free complex of a transition metal of Group VIII of the Periodic Table selected from the group consisting of iron, cobalt and nickel $\pi$ bonded to an electron donor Lewis base selected from the group consisting of ethers, tertiary amines, alkylphosphines, aryl phosphines, alkyl phosphites, aryl phosphites, alkyl arsines, aryl arsines, alkyl stibines, aryl stibines, alkyl bismuthines, aryl bismuthines and compounds with C≡C bonds.

2. Process according to claim 1, wherein said conjugated diene is butadiene.

3. Process according to claim 1, wherein said conjugated diene is isoprene.

4. Process according to claim 1, wherein said conjugated diene is piperylene.

5. Process according to claim 2, wherein said butadiene is an impure crude butadiene.

6. Process according to claim 1, wherein said group VIII metal is nickel.

7. Process according to claim 1, wherein said Group VIII metal is cobalt.

8. Process according to claim 1, wherein said Group VIII metal is iron, said diene is butadiene and the predominant reaction product is 5-methylheptatri-1,3,6-ene.

9. Process according to claim 1, wherein said tertiary amines are selected from the group consisting of triethylamine and triphenylamine.

10. Process according to claim 1, wherein said electron donor Lewis bases are selected from the group consisting of triethylphosphine, triphenylphosphine, triethylarsine, triphenylarsine, triethylstibine, triphenylstibine, triethylbismuthine, triphenyl bismuthine and phosphorous acid trimorpholide.

11. Process according to claim 1, wherein said electron doner Lewis base is triphenyl phosphine.

12. Process according to claim 1, wherein said carbonyl moiety-free complex is Ni[P(C$_6$H$_5$)$_3$]$_4$.

13. Process according to claim 1, wherein said carbonyl moiety-free complex is Ni[P(C$_6$H$_5$)$_3$]$_2$.

14. Process according to claim 1, wherein said carbonyl moiety-free complex is [(C$_6$H$_5$)$_3$P]$_2$NiC$_8$H$_{12}$.

15. Process according to claim 1, wherein said ether is a cyclic ether.

16. Process according to claim 1, wherein said tertiary amine is a cyclic tertiary amine.

17. Process according to claim 1, wherein said compounds with C≡C bonds are selected from the group consisting of phenyl acetylene and methoxy vinylacetylene.

18. Process as claimed in claim 1, carried out in the presence of an organic solvent substantially inert to the reactants, reaction products and catalysts under reaction conditions.

19. Process as claimed in claim 1, carried out at about 1 to 20 atmospheres pressure and about 20 to 150° C.

20. Process according to claim 1, wherein said complex is prepared in the presence of said conjugated diene.

21. Process according to claim 1, wherein said Lewis base is a triaryl phosphite and said transition metal is nickel; wherein the ratio of triaryl phopshite to nickel in said complex is up to about 4:1.

22. Process according to claim 21, wherein said molar ratio of triarylphosphite to nickel compound is from 2:1 to 1:1.

23. A process according to claim 21, which comprises effecting said contacting and oligomerizing at a pressure between atmospheric pressure and 200 atmospheres and a temperature of about between 0° and 200° C.

24. A process according to claim 21 which comprises effecting said contacting and oligomerizing at a pressure of between 1 and 50 atmospheres and temperature of between 70° and 140° C.

25. A process according to claim 21 which comprises effecting said contacting an oligomerizing in the presence of an inert diluent.

26. A process according to claim 21, wherein said complex is prepared in the presence of said conjugated diene.

27. A process according to claim 21, wherein said conjugated diene is added immediately after preparing of said complex catalyst.

28. A process according to claim 21, wherein said triaryl phosphite is tri-$\alpha$-naphthyl phosphite.

29. A process according to claim 21, wherein said triaryl phopshite is triguaiacyl phosphite.

30. A process according to claim 21, wherein said triaryl phosphite is tri-(o-oxy-diphenyl)phosphite.

31. A process according to claim 21, whrein said triaryl phosphite is selected from the group of ortho-, meta- and para-tri-monomethoxy phenylphosphites.

32. In a process for the production of dimers and trimers of butadiene-(1,3) wherein butadiene-(1,3) is converted into said dimers and trimers at a temperature between 0 and 200° C. in the presence of a catalyst obtained by mixing (a) a member selected from the group consisting of salts and chelate complexes of the metals of the iron group of the Periodic System of Elements; (b) a compound selected from the group consisting of ethoxy diethyl aluminum, triethyl aluminum, triisobutyl aluminum and diethyl aluminum hydride; and (c) a phosphite, the improvement which comprises using as component (c) a phosphite having at least one aryl radical which is substituted in o-position to the oxygen atom which is attached to the phosphorus atom.

33. In a process for the production of dimers and trimers of butadiene-(1,3) wherein butadiene-(1,3) is converted into said dimers and trimers at a temperature between 0 and 200° C. in the presence of a catalyst obtained by mixing (a) a member selected from the group consisting of salts and chelate complexes of the metals of the iron group of the Periodic System of Elements; (b) a compound selected from the group consisting of ethoxy diethyl aluminum, triethyl aluminum, triisobutyl aluminum and diethyl aluminum hydride; and (c) a phosphite, the improvement which comprises using as component (c) a phosphite having at least one phenyl radical substituted in o-position to the oxygen which is attached to the phosphorus atom by a member selected from the group consisting of a hydrocarbon radical with 1 to 6 carbon atoms, alkoxy with 1 to 4 carbon atoms and a substituent which forms together with the carbon atom which it substitutes and the carbon atom in 3-position in relation to said oxygen atom a six-membered carbocyclic ring.

34. A process as set forth in claim 32, wherein the molar ratio of components (a) and (b) is between 1:1 and 1:20 and the molar ratio of the components (a) and (c) is between 1:1 and 1:6.

35. A process as set forth in claim 32, wherein the molar ratio of the components (a) and (c) is between 1:1 and 1:4.

36. In a process for the production of 1,5-cyclooctadiene in a reaction zone at a temperature up to about 150° C. by contacting butadiene with a cyclodimerization catalyst; the improvement which comprises effecting said cyclodimerization by a catalyst obtained by the reaction of:
- (a) one formula weight of a salt of a weak organic acid of a metal selected from the group consisting of nickel and cobalt;
- (b) from about 2–6 mols of an aluminum compound of the formula $AlR'_3$; and
- (c) at least about 0.5 mol of a trivalent phosphorus compound of the formula $PR''_3$;

wherein at least two of said R's are ethyl; and wherein two of said R's are ethyl, said third R' is ethoxy, and wherein R'' is selected from the group consisting of stable hydrocarbyl radicals having 2–6 carbon atoms per radical group, and hydrocarboxy groups, the stable hydrocarbyl component of which has from 6–12 carbon atoms per group.

37. Process of claim 36, wherein said metal of (a) is nickel, said aluminum compound is ethoxy diethyl aluminum, and said trivalent phosphorus compound is triphenyl phosphine or triphenyl phosphite.

38. Process of claim 36, wherein said 1,3-butadiene is methyl-substituted.

39. Process of claim 36, wherein said dimerization is carried out in an inert hydrocarbon solvent.

References Cited

UNITED STATES PATENTS

| | | | |
|---|---|---|---|
| 3,271,468 | 9/1966 | Wilke et al. | 260—666 B |
| 3,457,319 | 7/1969 | Olechowski et al. | 260—666 B |
| 3,238,265 | 3/1966 | Mueller | 260—666 B |
| 2,504,016 | 4/1950 | Foster | 260—666 B |
| 3,201,484 | 8/1965 | Myers | 260—666 B |
| 2,903,491 | 9/1959 | Reppe et al. | 260—666 B |
| 2,964,575 | 12/1960 | Sekul et al. | 260—666 B |
| 2,969,408 | 1/1961 | Nowlin et al. | 260—666 B |
| 2,972,640 | 2/1961 | Burks et al. | 260—666 B |
| 2,991,317 | 7/1961 | Sellers et al. | 260—666 B |
| 3,004,081 | 10/1961 | Boosmajian | 260—666 B |

OTHER REFERENCES

Y. M. Slobodin et al. Zhur. Obshchei Khim. (J. Gen. Chem.) 18, 1545.7 (1948) Chem. Abstracts No. 43: 1018b, 1949.

DELBERT E. GANTZ, Primary Examiner

V. O'KEEFE, Assistant Examiner

U.S. Cl. X.R.

260—677 R, 418, 168 R, 611